United States Patent
Allan

(10) Patent No.: US 7,024,477 B2
(45) Date of Patent: Apr. 4, 2006

(54) SERVICE TIME ANALYSIS METHODS FOR THE WSM QOS MONITOR

(75) Inventor: Ronald Campbell Allan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 781 days.

(21) Appl. No.: 09/895,971

(22) Filed: Jun. 29, 2001

(65) Prior Publication Data

US 2003/0005111 A1  Jan. 2, 2003

(51) Int. Cl.
G06F 15/173 (2006.01)

(52) U.S. Cl. .................................................. 709/224

(58) Field of Classification Search ................ 709/200, 709/224; 702/185
See application file for complete search history.

(56) References Cited

U.S. PATENT DOCUMENTS

| | | | |
|---|---|---|---|
| 6,006,260 A * | 12/1999 | Barrick et al. .............. 709/224 |
| 6,185,598 B1 * | 2/2001 | Farber et al. ............... 709/200 |
| 6,438,592 B1 * | 8/2002 | Killian ....................... 709/224 |
| 6,484,129 B1 * | 11/2002 | Klein et al. ................. 702/186 |
| 2002/0112049 A1 * | 8/2002 | Elnozahy et al. ........... 709/224 |

* cited by examiner

Primary Examiner—John Follansbee
Assistant Examiner—Dustin Nguyen
(74) Attorney, Agent, or Firm—Duke W. Yee; Jeffrey S. LaBaw; James O. Skarsten

(57) ABSTRACT

A method, program and system for service time analysis in a computer network are provided. The invention comprises receiving a request from a network client machine and recording the initial time value for the request. The request is forwarded to an origin server. The response stream from the origin server is instrumented with the initial time value (plus the service time taken for the origin server to respond) and sent back to the client machine. A uniform resource identifier (URI) request (e.g. images) is received from the client machine, and the service time for completing the URI is recorded. The URI request is forwarded to the origin server, and the service time value for the URI is updated to reflect the origin server response. The URI response from the origin server is then sent to the client machine.

15 Claims, 3 Drawing Sheets

SERVICE TIME ANALYSIS METHODS FOR THE WSM QOS MONITOR

BACKGROUND OF THE INVENTION

1. Technical Field

The present invention relates generally to computer network environments. More specifically, the invention relates to quality control and monitoring the time required to service requests.

2. Description of Related Art

Current quality-of-service monitors used in web server management applications collect metrics on the end user experience, the page display, and the service times. The metrics collected for the service time are focused on the service time needed to retrieve the container page only. The container page is the initially requested resource. However, this page may contain other resources that need to be retrieved in order to fulfill the request. Examples of other resources include images and embedded applications (i.e. anything embedded in the container page that needs to be retrieved with a separate request). Current quality control monitors do not track the service time taken to retrieve these other resources.

In prior art QoS, there is no timing mechanism for any of the inline content that makes up a complete web page. When a page is requested using Hypertext Transport Protocol (HTTP), the container page is delivered to the web browser. At that point, the web browser parses the page and makes separate requests for each of the inline elements contained in that web page. Each of these requests is stateless, by the very nature of HTTP 1.0, and potentially stateless in HTTP 1.1. Stateless, means that the software does not keep track of configuration settings, transaction information, or any other data for the next session.

In a distributed environment, it is not reasonable to assume that the web server that responded to the request for the container page is the same web server that will be asked to deliver all, or even any, of the inline elements of the page. Even if the QoS that serviced the original request (container page) received a new request for one of the inline members of the container page, it has no mechanism for recognizing the new request as a member of the original request.

Therefore, it would be desirable to have a method for monitoring the service time needed to retrieve a web page, including the container page and all inline elements.

SUMMARY OF THE INVENTION

The present invention provides a method, program and system for service time analysis in a computer network. The invention comprises receiving a request from a network client machine and recording the initial time value for the request. The request is forwarded to an origin server. The response stream from the origin server is instrumented with the initial time value (plus the service time taken for the origin server to respond) and sent back to the client machine. A uniform resource identifier (URI) request (e.g. images) is received from the client machine, and the service time for completing the URI is recorded. The URI request is forwarded to the origin server, and the service time value for the URI is updated to reflect the origin server response. The URI response from the origin server is then sent to the client machine.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
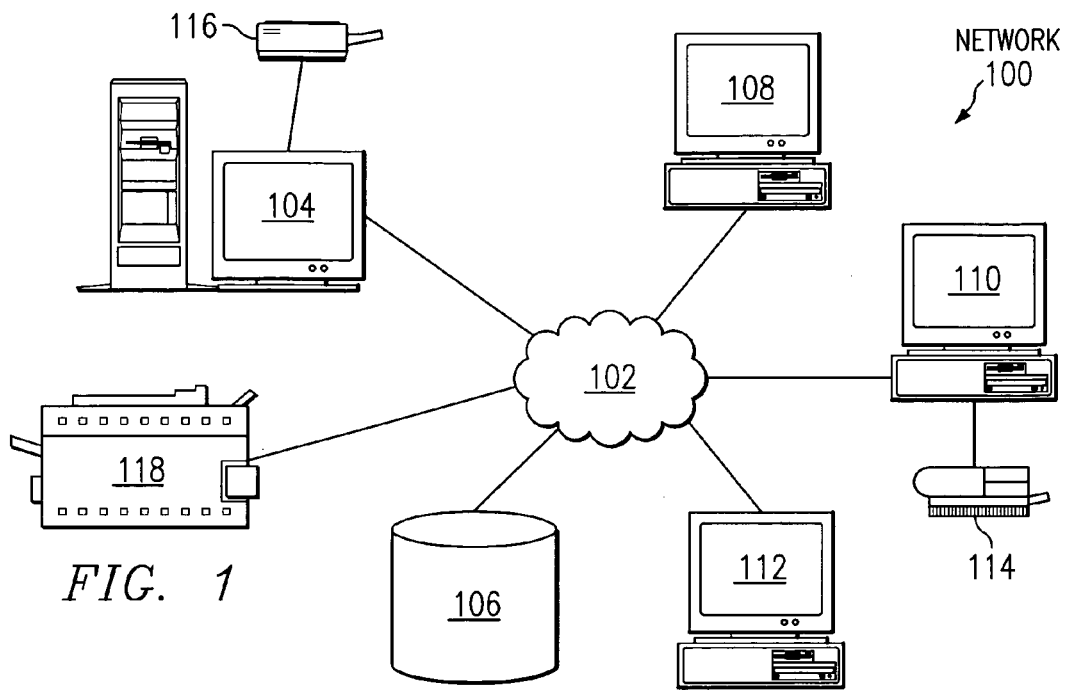
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108–112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
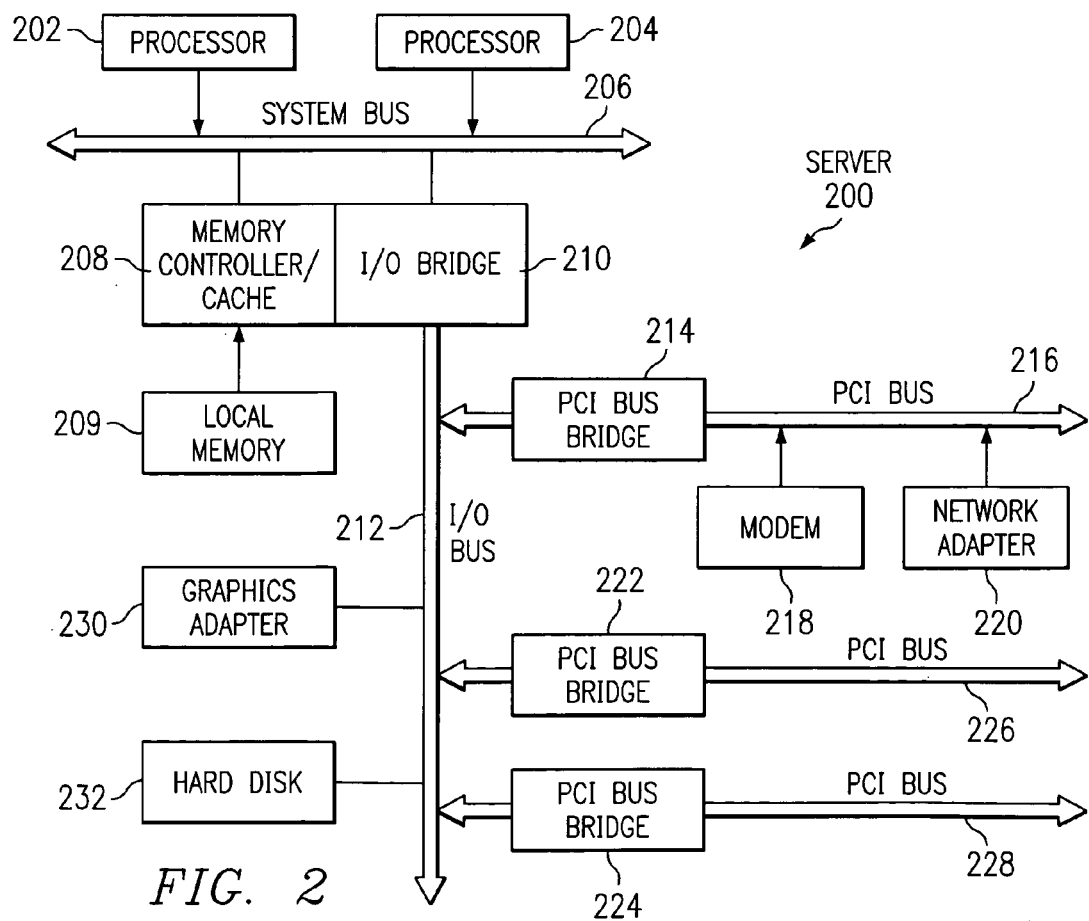
FIG. 2 depicts a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an eServer pSeries system, a product of International Business Machines Corporation in Armonk, N.Y., running the Advanced Interactive Executive (AIX) or Linux operating systems.

Figure 3:
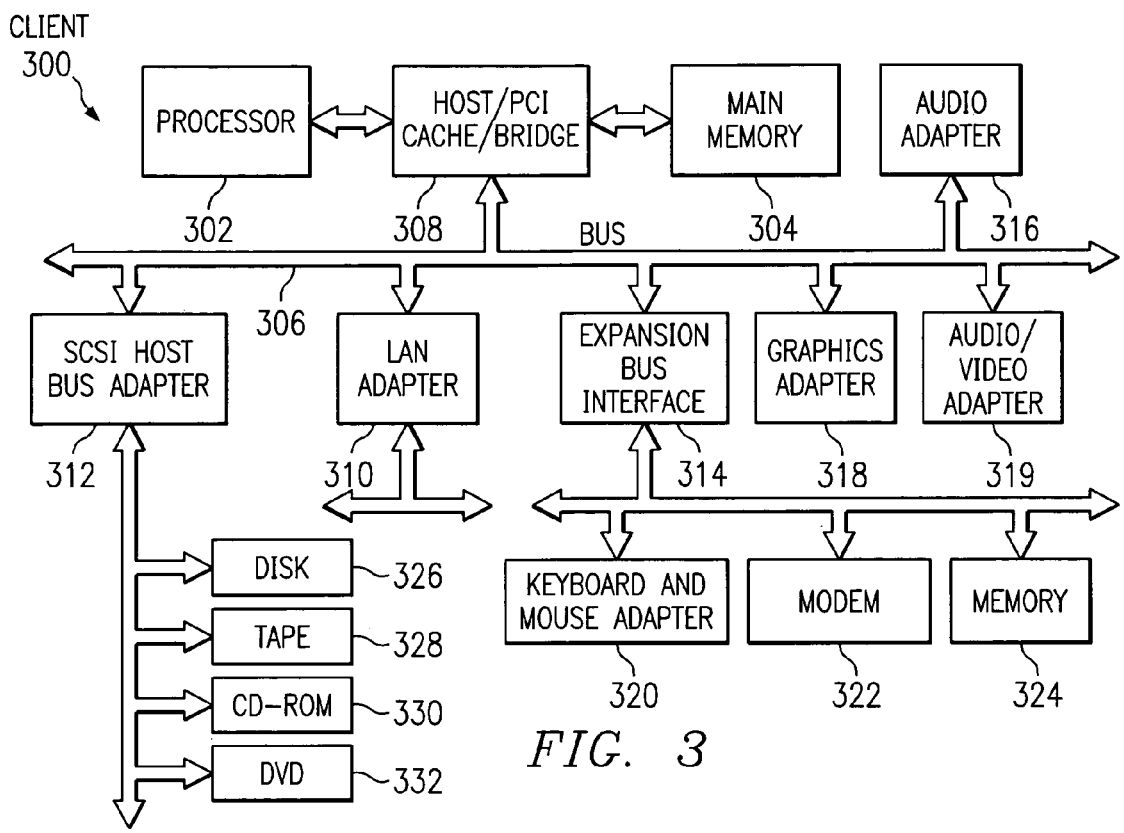
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, CD-ROM drive 330, and DVD drive 332. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention involves Quality of Service (QoS), which is the ability to define and measure a level of performance in a data communication system; in the present context, the time taken to fulfill requests for data. The present invention can be implemented using three separate methods for solving the service time problem. However, these methods have significant overlap in how they work, and more than one method might be needed to accommodate various customer scenarios. The three methods have the following configurations:

1. QoS monitoring is handled by a single QoS reverse proxy.
2. QoS monitoring is handled by several "transaction agents" and redirected through the QoS reverse proxy.
3. QoS monitoring is handled by several "transaction agents" and collected by the QoS controller.

All three of these methods take advantage of the cookie present in each request originating from an instrumented container page; that is, a page containing the QoS JavaScript agent. The cookie is data stored on a client computer and used by web sites to keep track of a user's patterns and preferences. The cookie is a key that can be used to impose the notion of a session on a series of otherwise disparate requests. Each method creates a table of key/value pairs, where the key is the cookie inserted into the Hypertext Transport Protocol (HTTP) request header and the value is the time stamp signifying when the service time for a given Uniform Resource Identifier (URI) is complete.

The prior art QoS technology can provide individual times on each element as long as all of the requests are obtained from the same web server. However, this is not the typical case for retrieving a web page. In a distributed environment, it is not reasonable to assume that the web server that responded to the request for the container page is the same web server that will be asked to deliver all, or even any, of the inline elements of the page. Even if the QoS that serviced the original request (container page) received a new request for one of the inline members of the container page, it has no mechanism for recognizing the new request as a member of the original request.

The present invention produces a relationship between the original page and its inline elements through session IDs, sampling periods, and/or deployment strategies. The mathematical algorithm for the present invention is as follows:

For each request with ID <id num> start time=min(all request times)

stop time=max(all response times)

(Note: the start time will be the container page.)

The goal is for QoS to be able to recognize all of the members of the request and produce a metric that states "the total time for the parent request and all of its inline content to be save was 'x'".

Figure 4:
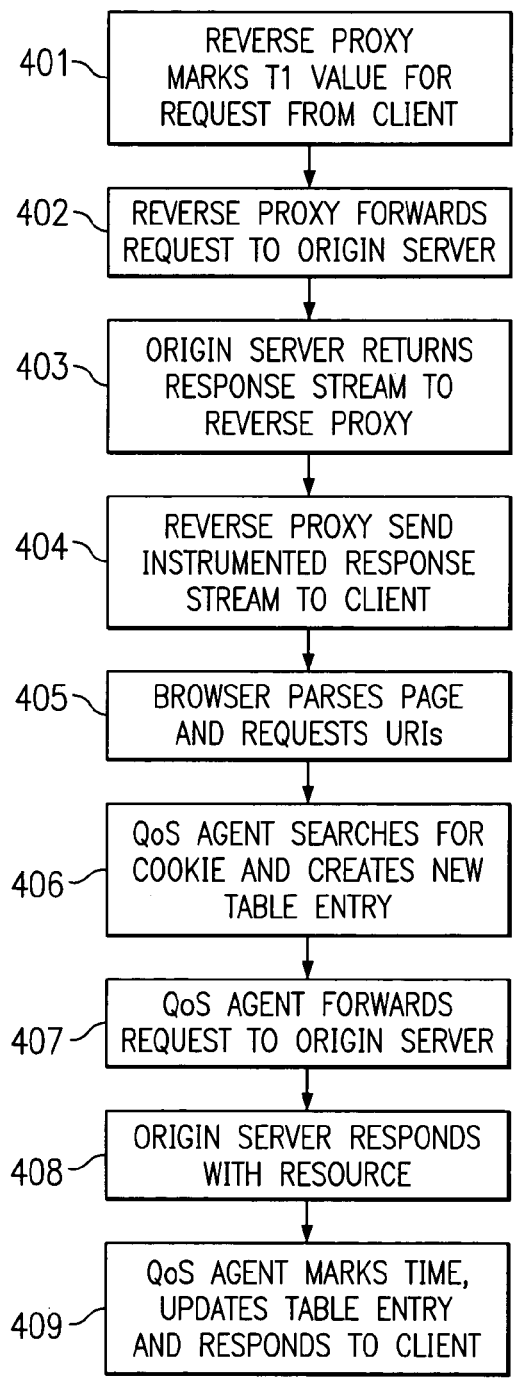
FIG. 4 depicts a flowchart illustrating a general transaction association mechanism in accordance with the present invention.

Referring to FIG. 4, a flowchart illustrating a general transaction association mechanism is depicted in accordance with the present invention. When the request for the container page is received, the QoS reverse proxy will mark the T1 value for the request (step 401) and forward the request to the origin server for processing (step 402). The T1 value is inserted as part of the Javascript agent that gets sent in the container page stream. This keeps the system stateless. The present invention does not depend on the same QoS that instrumented the response page being the QoS that receives the Javascript agent request from the client. Upon receiving the response stream from the origin server (step 403), the reverse proxy will instrument a valid response stream with the JavaScript agent and respond to the original client request with this instrumented response stream (step 404). The instrumentation contains the original T1 value as well as the service time taken for the container page. As the page is received at the client, the browser parses the page and issues a request for each of the URIs that make up the presentation of the page, which are generally the images contained on the page (step 405). As each request is received by the QoS agent, i.e. either the reverse proxy or some other agent (such as a web server plug-in), the agent searches for the JavaScript-inserted cookie in the request headers and creates a new table entry using the value of this cookie as the key in the table, if the key does not already exist (step 406). The QoS agent then forwards the request to the origin server (step 407). When the origin server responds with the resource (step 408), the QoS agent marks the time of the response T2, updates the table entry value with this time stamp, and responds to the requesting client (step 409). This is possible because the child process, or thread, that received the client request will also receive the origin server response. The web browser on the client will run the Javascript agent which will make the request. When the QoS agent receives the JavaScript-generated request that contains the transaction record, the agent retrieves the cookie from the request headers, searches the table for this key, and retrieves the time value from the entry. The difference between this value and the T1 value of the transaction record is the service time for the transaction.

None of the methods of the present invention require the current data upload or event semantics to change. The records produced by the QoS monitor are uploaded after processing, and any events that occur are forwarded using the event notification system.

Collecting service times on all transactions may incur an unacceptable overhead. Therefore, all of the methods in the present invention will support the notion of service time sampling. In order to support sampling, two new commands will need to be added to the QoS controller. These are the "sample_on" and "sample_off" commands. When the sample_on command is issued, the QoS monitor will begin to collect service time metrics on all of the URIs that pass through the QoS agent. When the controller issues the sample_off command, the QoS agent will cease collecting service time metrics and make the collected data available for processing. Like other QoS commands, these commands will be issued using HyperText Transport Protocol Secure (HTTPS). However, HTTP may be used as well.

When the data is sampled, a unique identifier will be added to the service time key/value pair in the transaction record, to differentiate it from the container-page-only service time metric. In this embodiment, the sampling rate is configured during task creation. The configuration may include a URI specification stage so that only certain URIs will be sampled.

The first method addresses the customer scenario for QoS where the QoS reverse proxy handles all of the requests that make up a transaction. This includes the container page and all of the referenced resources in the container page. This is the simplest scenario. The service time metrics are collected according to the heuristic described above, and the data ends up as the Service Time (ST) value in the transaction record produced by the QoS reverse proxy. FIG. 4 has described a situation in which only one element within a container page is being retrieved. However, in actual application, the process flow in FIG. 4 can be used to retrieve multiple inline elements.

Figure 5:
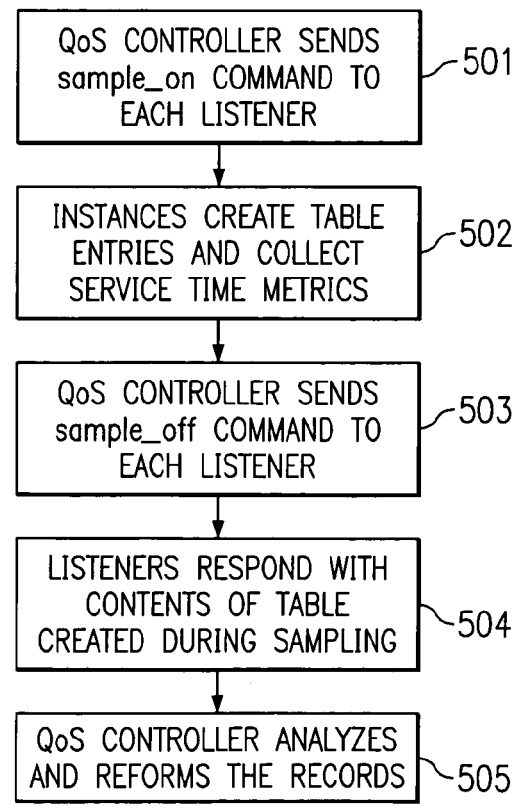
FIG. 5 depicts a flowchart illustrating transaction association using multiple servers in accordance with the present invention.

Referring now to FIG. 5, a flowchart illustrating transaction association using multiple servers is depicted in accordance with the present invention. This represents the second method for implementing the present invention and involves reassembling the transaction from multiple sources. Once again, the cookies generated by the JavaScript agent are used to group the transaction components. As in the first method, a table of service times is created for each transaction component, with the cookie as the key. However, unlike the first method, a communication method is also needed between the QoS monitor and either other monitors or the web servers themselves. In addition, each web server of interest needs to have either a QoS reverse proxy working on its behalf or a plug-in that will recognize the commands, time stamp the service time requests, and make the results available to the controlling agent (a QoS monitor piece). It should be noted that creating a plug-in for the three major web servers (Apache, iplanet, and IIS) is not a significant obstacle.

Whether the second method is performed using a series of QoS reverse proxies deployed in front of the machines of interest, or as a set of plug-ins integrated into the web servers, the method is similar. At "sample on" time, the QoS controller sends a command to each of the participating "listeners" (step 501). A listener is any QoS agent such as a reverse proxy or a web server plug-in. During the sampling period, the QoS reverse proxies create table entries for all key/value pairs and collect service time metrics (as in FIG. 4) for the transactions (step 502). In the preferred embodiment, the table is a shared memory table. Therefore, each child thread or process in a QoS agent can access and add new entries to the table. Those skilled in the art will appreciate that other methods of assembling the QoS data are possible. When the controller sends the sample_off command to end the sample period (step 503), each listener responds to the controller with the contents of the table created during this period (step 504). This is possible through the HTTP request/response mechanism. In this method, the controller is responsible for creating the association between the records and the service time. This requires that the records maintained by the QoS agents (for controller retrieval) contain the cookie value so that the service time analysis can take place at the controller. The records are analyzed and reformed by the controller prior to uploading the data to the management server (step 505). If there are no service time metrics available from the sampling period for a record, that record is unaltered and the service time it contains represents the service time of the container page only.

Figure 6:
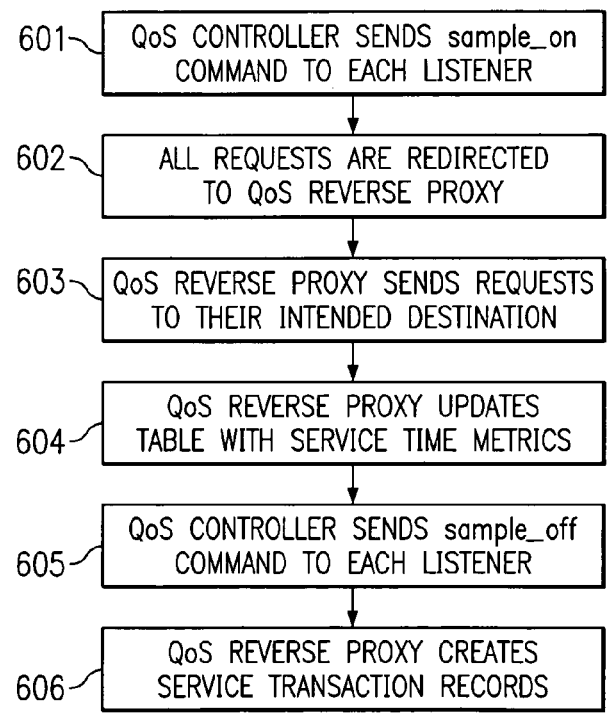
FIG. 6 depicts a flowchart illustrating transaction management using a hybrid of QoS reverse proxy and multiple servers, in accordance with the present invention.

Referring to FIG. 6, a flowchart illustrating QoS management using the third method, which is a hybrid of the first and second methods, is depicted in accordance with the present invention. At "sample on" time, the QoS controller sends a command to each of the participating listeners (step 601). Once the sampling has begun, all requests during the sampling period are redirected to the QoS reverse proxy (step 602). The redirected requests are then sent by the QoS reverse proxy to their intended destination (step 603). There is no time stamping of redirects because they do not explicitly return a container page. Therefore, they are left out of the timing. A header is added to this redirection to inform the recipient to process the request, thereby preventing an infinite loop. As the reverse proxy receives each response, it updates the table with the service time metrics (as in FIG. 4) (step 604). When the sample_off command is issued by the QoS controller (step 605), the QoS reverse proxy creates the transaction records with the service time data (step 606).

The QoS reverse proxies are typically deployed on the same machine as the actual web server on which behalf they work. However, they can also sit on their own machine and work on behalf of one or more web servers. The QoS boxes are deployed inside the same firewall parameters as the web server(s) for which they act as reverse proxies. In geographical terms, they are very close to the actual web server.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for service time analysis in a computer network, comprising the steps of:

receiving a request from a network client machine for an electronic document and recording an initial time value for the request;

forwarding the request to an origin server and receiving a response stream containing the electronic document from the origin server;

sending the response stream to the client machine, wherein the response stream is instrumented to contain the initial time value;

receiving at least one uniform resource identifier (URI) request from the client machine, wherein each received URI request is for a resource embedded within the electronic document;

creating a data structure that contains key/service time value pairs, wherein each pair is associated with one of said URI requests, and each key is an identifier present in its associated URI request;

forwarding each URI request to the origin server, and receiving a corresponding URI response from the origin server;

updating each of the service time values in said data structure, to indicate the time value for completing the response to each of said URI requests;

sending each URI response to the client machine; and using said keys and updated service time values from said data structure to compute the total time required to respond to all of said requests associated with said electronic document, including all of said URI requests, wherein the steps are performed by multiple reverse proxy servers, wherein a selected one of said reverse proxy servers acts as the controlling quality-of-service monitor, and the remaining reverse proxy servers are subordinate servers to the controlling monitor.

2. The method according to claim 1, wherein said data structure comprises a table, and each key in said table of key/time value pairs is a cookie in a request header; and said table of key/time value pairs is created and updated by at least one reverse proxy server associated with said origin server.

3. The method according to claim 1, wherein the instrumented response stream further comprises:

the service time taken for the origin server to respond.

4. The method according to claim 1, wherein all steps are performed by a single reverse proxy server.

5. The method according to claim 1, wherein:

the controlling monitor sends a sample-on command to the subordinate servers;

in response to the sample-on command, the subordinate servers record service time metrics for request transactions;

the controlling monitor sends a sample-off command to the subordinate servers;

in response to the sample-off command, the subordinate sewers send their respective service time records to the controlling monitor; and the controlling monitor analyzes and reorganizes the service time records from the subordinate servers into a single record.

6. A computer program product in a computer readable medium for use in a data processing system, for service time analysis in a computer network, the computer program product comprising:

instructions for receiving a request from a network client machine for an electronic document and recording an initial time value for the request;

instructions for forwarding the request to an origin server and receiving a response stream containing the electronic document from the origin server;

instructions for sending the response stream to the client machine, wherein the response stream is instrumented to contain the initial time value;

instructions for receiving at least one uniform resource identifier (URI) request from the client machine, wherein each received URI request is for a resource embedded within the electronic document;

instructions for creating a data structure that contains key/service time value pairs, wherein each pair is associated with one of said URI requests, and each key is an identifier present in its associated URI request;

instructions for forwarding each URI request to the origin server, and receiving a corresponding URI response from the origin server;

instructions for updating each of the service time values in said data structure, to indicate the time value for completing the response to each of said URI requests;

instructions for sending each URI response to the client machine; and instructions for using said keys and said updated service time values from said data structure to compute the total time required to respond to all of said requests associated with said electronic document, including all of said URI requests, wherein the instructions are performed by multiple reverse proxy servers, wherein a selected one of said reverse proxy servers acts as the controlling quality-of-service monitor, and the remaining reverse proxy servers are subordinate servers to the controlling monitor.

7. The computer program product according to claim 6, wherein said data structure comprises a table, and each key in said table of key/time value pairs is a cookie in a request header; and said table of key/time value pairs is created and updated by at least one reverse proxy server associated with said origin server.

8. The computer program product according to claim 6, wherein the instrumented response stream further comprises:

the service time taken for the origin server to respond.

9. The computer program product according to claim 6, wherein all instructions are performed by a single reverse proxy server.

10. The computer program product according to claim 6, further comprising:

instructions for sending a sample-on command from the controlling monitor to the subordinate servers;

in response to the sample-on command, instructions for the subordinate servers to record service time metrics for request transactions;

instructions for sending a sample-off command from the controlling monitor to the subordinate servers;

in response to the sample-off command, instructions for the subordinate servers to send their respective service time records to the controlling monitor; and instructions for the controlling monitor to analyze and reorganize the service time records from the subordinate servers into a single record.

11. A system for service time analysis in a computer network, comprising:

a first receiving component which receives a request from, a network client machine for an electronic document and records an initial time value for the request;

a first communication component which forwards the request to an origin server and receives a response stream containing the electronic document from the origin server;

a second communication component which sends the response stream to the client machine, wherein the response stream is instrumented to contain the initial time value;

a second receiving component which receives at least one uniform resource identifier (URI) request from the client machine, wherein each received URI request is for a resource embedded in the electronic document;

a component for creating a data structure that contains key/service time value pairs, wherein each pair is associated with one of said URI requests, and each key is an identifier present in its associated URI request;

a third communication component which forwards each URI request to the origin server, and receives a corresponding URI response from the origin server;

an updating component which updates each of the service time values in said data structure, to indicate the time value for completing the response to each of said URI requests;

a fourth communication component which sends each URI response to the client machine; and a processing component adapted to use said keys and said updated service time values from said data structure to compute the total time required to respond to all of said requests associated with said electronic document, including all of said URI requests, wherein the components are contained in multiple reverse proxy servers, wherein a selected one of said reverse proxy servers acts as the controlling quality-of-service monitor, and the remaining-reverse proxy servers are subordinate servers to the controlling monitor.

12. The system according to claim 11, wherein said data structure comprises a table and said system further comprises a register which maintains said table of key/time value pairs, wherein each key is a cookie in a request header; and said table of key/time value pairs is created and updated by at least one reverse proxy server associated with said origin server.

13. The system according to claim 11, wherein the instrumented response stream further comprises:

the service time taken for the origin server to respond.

14. The system according to claim 11, wherein all components are contained in a single reverse proxy server.

15. The system according to claim 11, further comprising:

a first communication component which sends a sample-on command from the controlling monitor to the subordinate servers;

a plurality of recording components in the subordinate servers which, in response to the sample-on command, record service time metrics for request transactions;

a second communication component which sends a sample-off command from the controlling monitor to the subordinate servers;

a plurality of response components in the subordinate servers which, in response to the sample-off command, send their respective service time records to the controlling monitor; and a processor in the controlling monitor which analyzes and reorganizes the service time records from the subordinate servers into a singe record.

* * * * *